Nov. 2, 1948.  H. SHAW  2,452,876
WELDING ROD AND ELECTRODE HOLDER
Filed Sept. 4, 1945  3 Sheets-Sheet 1
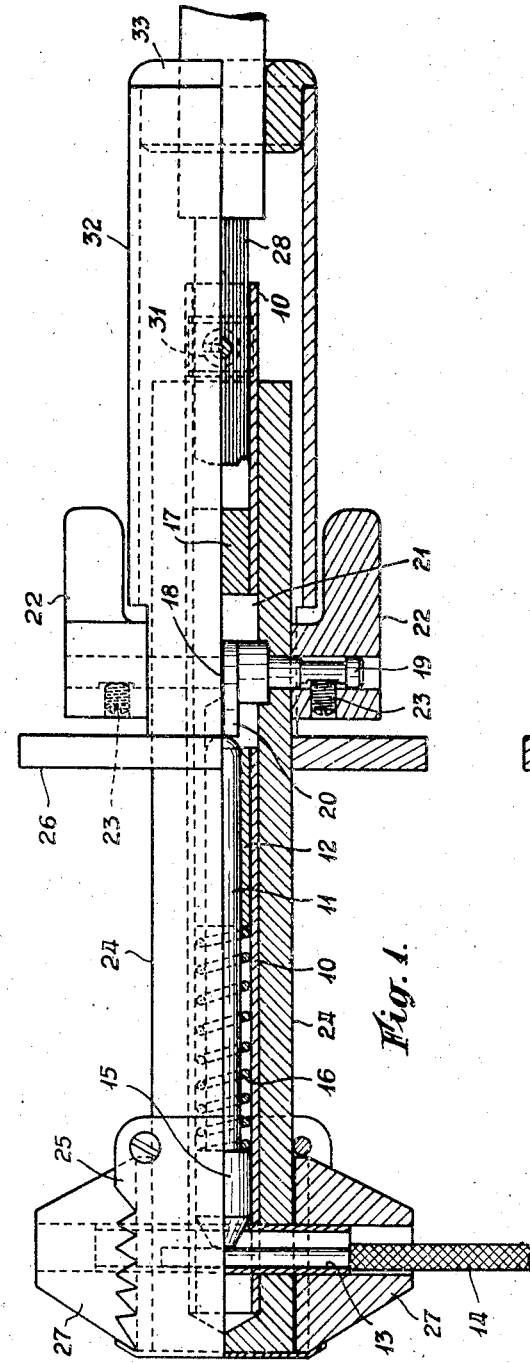
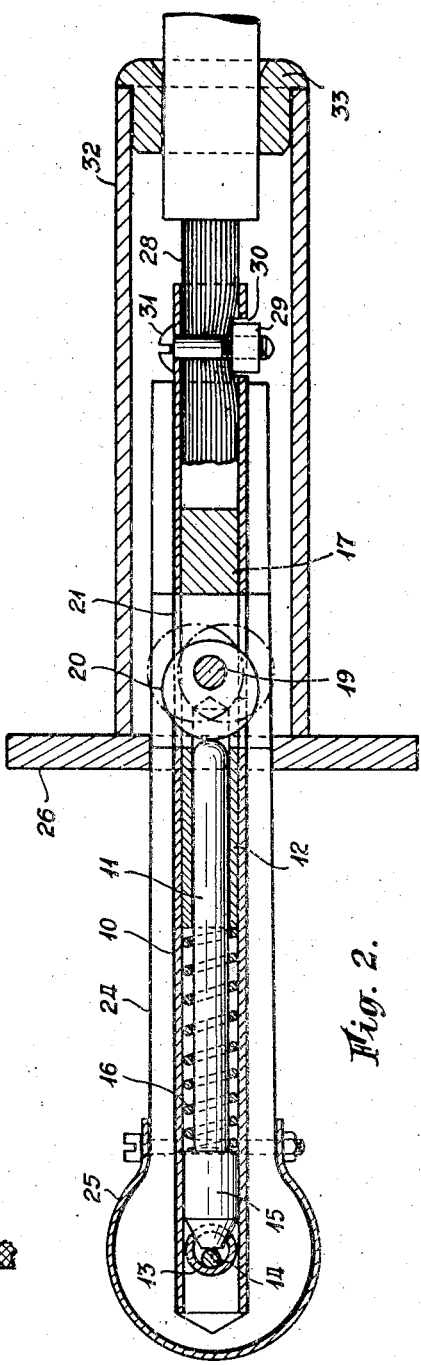
INVENTOR
HENRY SHAW
ATTORNEYS

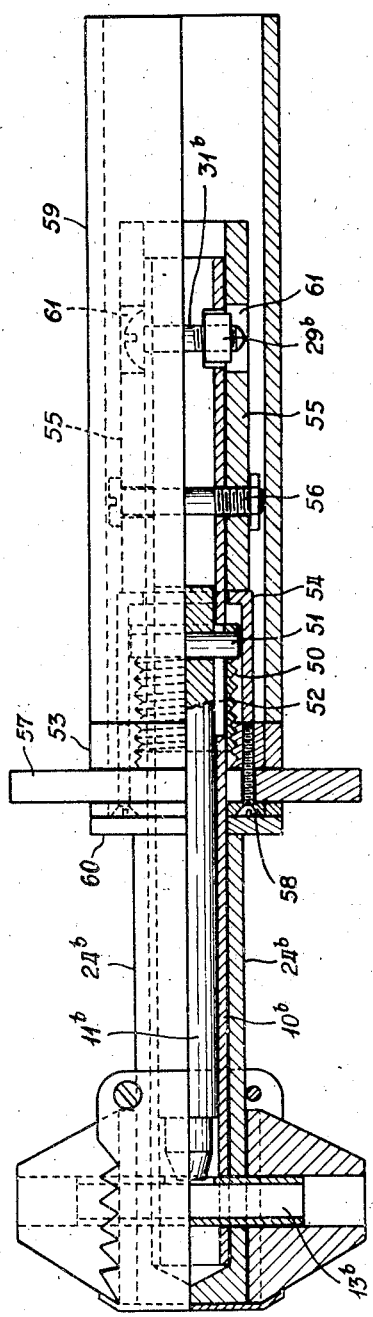
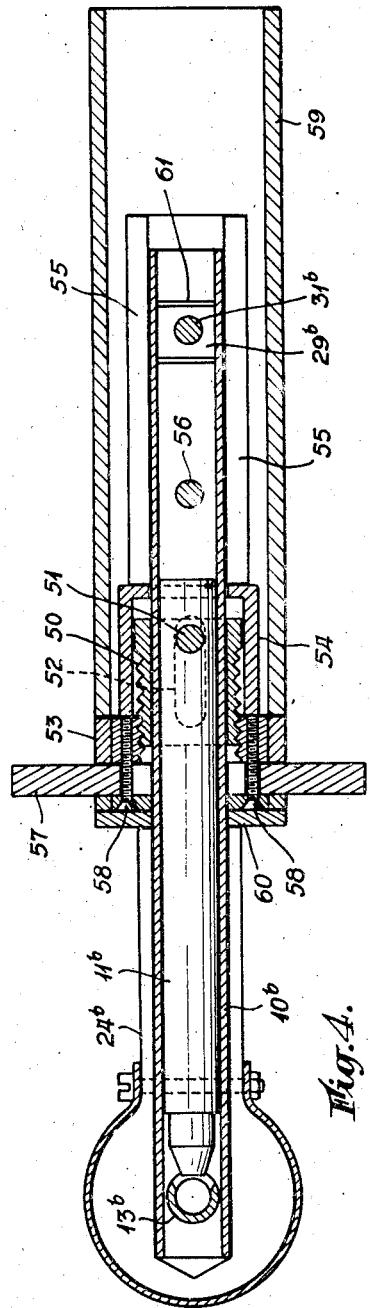

Nov. 2, 1948.   H. SHAW   2,452,876
WELDING ROD AND ELECTRODE HOLDER
Filed Sept. 4, 1945   3 Sheets-Sheet 3

INVENTOR
HENRY SHAW
By Fraser Myers Manley
ATTORNEYS

Patented Nov. 2, 1948

2,452,876

UNITED STATES PATENT OFFICE 2,452,876

WELDING ROD AND ELECTRODE HOLDER

Henry Shaw, Bessacarr, Doncaster, England

Application September 4, 1945, Serial No. 614,388
In Great Britain September 4, 1944

5 Claims. (Cl. 219—8)

This invention relates to holders for welding rods or electrodes.

An object of the invention is to provide an improved holder of built-up construction in which the parts can be readily renewed.

A further object of the invention is to provide gripping means in the holder for positively and effectively holding a welding rod or electrode for operative use.

A still further object is to provide that the holder will be electrically insulated externally.

A still further object is to provide means in the holder which will be capable of holding rods or electrodes of various thickness.

A holder for welding rods or electrodes embodying these and other objects will now be described with reference to the accompanying diagrammatic drawings.

In these drawings:

Fig. 1 is an elevation, half in section, of one form of welding rod or electrode holder made in accordance with this invention.

Fig. 2 is a sectioal plan of Fig. 1.

Fig. 3 is an elevation, half in section, of a further modified form of holder.

Fig. 4 is a sectional plan of Fig. 3.

Figure 5:
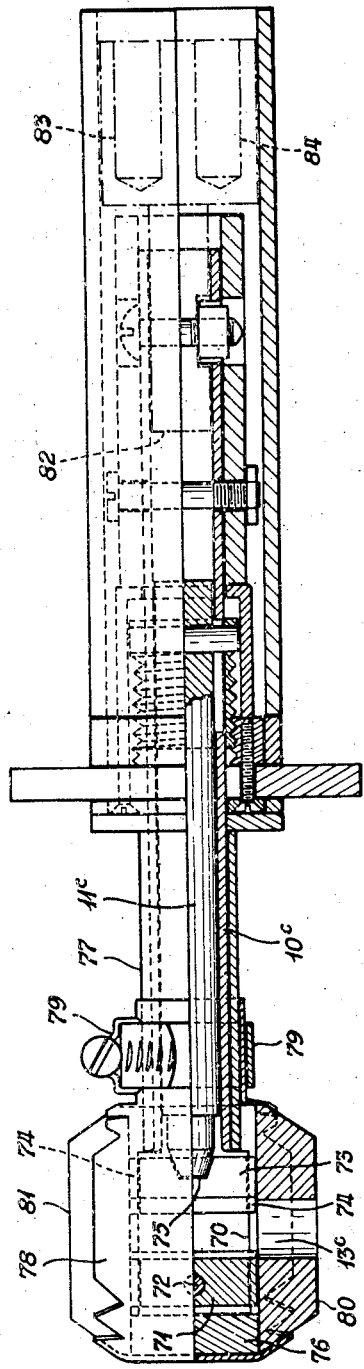
Fig. 5 is an elevation, half in section, of a still further modified form of holder.

In Figs. 1 and 2, the holder comprises a tubular body constituting a plunger guide 10 accommodating a plunger 11 operable at one end thereof.

The inner end of the plunger is carried in a sleeve 12 disposed axially in the plunger guide 10 in fixed relation thereto. At its outer end, the plunger guide is provided with a tubular crosshead welded thereto and constitutes a guide 13 for receiving a welding rod 14, said welding rod guide intersecting the plunger guide and being open thereto at the plunger side for admitting projection of the head 15 of said plunger into the welding rod guide 13 and into contact with the welding rod 14 therein. Interposed between the plunger head 15 and the sleeve 12, is a coiled spring 16 which, owing to its bearing against the end of the sleeve, exerts a yielding pressure forwardly upon the plunger head sufficiently to project said plunger head into the welding rod guide 13 with enough pressure to releasedly retain the welding rod 14 therein.

The end of the sleeve 12 remote from the plunger 11 is formed with a solid extremity 17 and a length of this is cut away for half its diameter and thus provides that the remaining half forms a bearing 18 for the spindle 19 of a cam 20 which is adapted to act upon the inner end of the plunger 11. The plunger guide 10 is also cut away for half its diameter at a point opposite the bearing 18, as indicated at 21, in order to accommodate the cam 20 and the cam spindle 19. The projecting ends of the cam spindle are fitted with thumb levers 22 which are keyed to the spindle by grub screws 23.

Enclosing the plunger guide 10 and crosshead 13, is a pair of electrically insulated and fireproof longitudinal cover members 24 which, together, are of rectangular cross section externally and are clamped together at one end by means of a clip 25 and held at the other end by the thumb levers 22 and a flame shield 26.

Hollow conical cover members 27 are secured to the longitudinal cover members 24 for enclosing the end of the welding rod guide 13 and thereby electrically insulating it externally.

The end of the plunger guide 10 remote from the plunger 11 is adapted to receive the end of a cable 28, the necessary electrical contact with the plunger guide being obtained by the terminal nut 29 which is held in a slot 30 in said plunger guide by a set screw 31.

A tubular handle 32 of electrically insulating material is a push-on fit over the four external corners of the cover members 24 and is fitted with an end closure plug 33, orificed to admit the cable 28.

In use, the welding rod 14 is entered into the crosshead or guide 13 past the head 15 of the plunger 11, said plunger yielding rearwardly and gently gripping the rod 14 against the wall of the guide 13. The thumb levers 22 are then manipulated to operate the cam 20 in a direction to cause it to exert a non-yielding pressure upon the plunger 11 until the abutment of the plunger head 15 upon the rod 14 is sufficient to securely hold the rod in position for use.

For subsequently releasing the rod 14, thumb levers 22 are re-operated to withdraw the cam from contact with the plunger 11 so as to permit yielding pressure to obtain again upon the rod, whereupon said rod can be readily withdrawn.

Electrical current from the cable 28 passes through the plunger guide 10 to the rod guide 13 and so to the rod 14 therein.

In Figs. 3 and 4, the plunger 11b is actuated by direct thrust, that is to say, without being initially spring pressed and is operated by a screw device comprising an exteriorly screw threaded sleeve 50 axially slidable on the plunger guide 10b and keyed to the plunger 11b by a pin 51 passing therethrough and through an elongated slot 52 in the plunger guide. The sleeve 50 is engaged by an internally screw threaded rotatable operating collar 53 against which abuts a loose flanged cylindrical thrust member 54. This thrust member is a loose sliding fit over the sleeve 50 and is held in abutment with the operating collar 53 by a pair of electrically insulating cover members 55 detachably secured to the plunger guide 10b by a bolt 56. The pin 51 keying the sleeve 50 to the plunger 11b is a loose pin held in position by the thrust member 54 and owing to its engaging the slot 62 in the plunger guide 10b, prevents rotation of the sleeve 50 and the plunger 11b.

The rotatable operating collar 53 is provided with a circular flame shield 57 made of electrically insulating material, said flame shield being made fast to the collar 53 by set screws 58 and serving as manipulable means by which said collar can be rotated.

As will be seen, the rotatable operating collar 53 is held against any axial traverse by reason of the thrust member 54 and the cover members 55 at one end and the cover members 24b at the other end of said collar. On rotation of the collar 53, the sleeve 50 which has screw threaded engagement therewith is caused to slide axially owing to the pin 51 preventing rotation of the sleeve and since the pin is carried by the sleeve, said sleeve will move a distance determined by the length of the slot 52 within the limits of which the pin 51 has movement. As this pin is keyed to the plunger 11b, said plunger is thereby actuated by the operating collar 53. The length of the slot 52 is such as to permit of axial movement of the plunger into the rod guide 13b sufficiently to contact and securely hold a welding rod therein.

An electrically insulating handle 59, in the form of a cylindrical sheath is slidably fitted on to the cover members 55, said cover members being of rectangular shape externally in cross section. The sheath constituting the handle 59 consequently has slidable engagement with the four external corners of the cover members 55.

A thrust washer 60 is interposed between the operating collar 53 and the longitudinal cover members 24b.

The cover members 55 are suitably orificed at 61 to admit of the terminal nut 29b and set screw 31b being secured to the cable receiving end of the plunger guide 10b.

Figure 6:
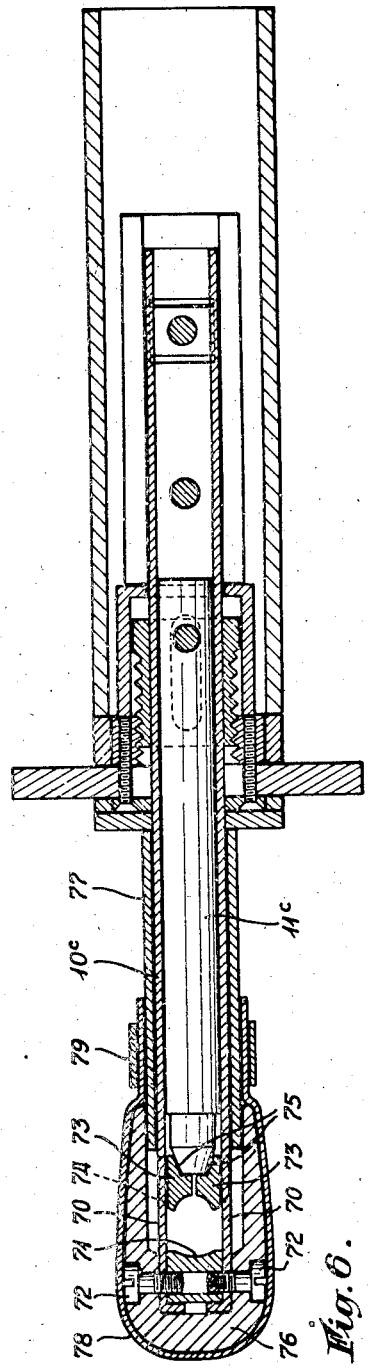
Fig. 6 is a sectional plan of Fig. 5.

A still further alternative form of welding rod or electrode holder is depicted in Figs. 5 and 6 in which, although the plunger 11c is operated by screw threaded means similar to that described with reference to Figs. 3 and 4, the welding rod receiving head is provided with a modified arrangement for gripping the rod.

The head comprises two spaced parallel guides 70 formed by oppositely disposed integral flat extensions of the outer end of the plunger guide 10c. These guides accommodate a fixed jaw 71 secured to the guides at one end thereof by set screws 72 and a pair of side by side movable jaws 73 accommodated at the other end of the guides in opposing relation to the fixed jaw for movement, together, towards and away from the fixed jaw. These movable jaws are slidably retained within the guides 70 against lateral displacement by rearwardly extending enlargements 74 at their ends, said enlargements slidably engaging the edges of the guides 70. Each movable jaw is recessed at 75 in its rear face whereby the two adjacent and companion recesses formed thereby, constitute a seating for the operative end of the plunger 11c.

The guides 70 are embraced by an electrically insulating U-shaped sheath 76, the ends of which clasp one end of a sleeve 77 of electrically insulating material, said sleeve enclosing a length of the plunger guide 10c. The sheath 76 and sleeve 77 are held in position by a retaining clip 78 which is clamped to the sleeve by a spring clip 79. Cover pieces 80 and 81, held by the retaining clip 78, are provided at the open sides of the U-shaped sheath 76, the one cover piece 80 being orificed to form, in conjunction with the opening between the jaws 71 and 73, the welding rod receiving guide 13c and the other cover piece 81 serving as an abutment for the end of the welding rod to determine the extent of insertion of said rod in the guide 13c.

The provision of the jaws 71 and 73 enables various thicknesses of rods to be effectively held and owing to the side by side movable jaws 73, provision obtains for their slight lateral movement apart when being forced against a rod under pressure of the plunger, thus ensuring good electrical contact with the guides 70 and preventing electrical current being thrown back on to the plunger. A wiping contact of the jaws 73 with the guides 70 also obtains on slidable movement of said jaws and this is conducive to good electrical contact.

Where two cables, instead of a single cable, are to be electrically connected to the plunger guide 10 of Figs. 1 and 2, or 10b of Figs. 3 and 4, or 10c of Figs. 5 and 6, an adaptor 82 having two cable receiving sockets 83 and 84, such as is shown in chain lines in Fig. 5, can be fitted into the cable receiving end of said plunger guide.

The improved welding rod or electrode holder made according to this invention is completely insulated and all the parts are renewable, as well as being easily replaceable. The holder is also of symmetrical construction and consequently a very convenient tool readily handled by the user without danger to himself.

What I claim and desire to secure by Letters Patent is:

1. In a holder for a welding rod, the combination with an insulated, electric-cable-receiving, tubular body carrying an insulated, welding-rod-receiving head in which a welding rod is holdable in a guideway therein by a plunger in said body, of oppositely disposed separately renewable insulating cover members for said head insulatingly extending about and enclosing the guideway therein, and means detachably securing said cover members to said head.

2. In a holder for a welding rod, the combination with an insulated, electric-cable-receiving, tubular body carrying an insulated, welding-rod-receiving head in which a welding rod is holdable in a guideway therein by a plunger in said body, of oppositely disposed separately renewable insulating cover members for said insulated head, of which one member serves as a closure to the guideway for limiting the extent of entry of a welding rod therein while the other member forms an insulated extension of said guideway at the entrant end thereof, and means detachably securing said cover members to said head.

3. In a holder for a welding rod, the combination with an insulated, electric-cable-receiving, tubular body carrying an insulated, welding-rod-receiving head in which a welding rod is holdable in a guideway therein by a plunger in said body, of oppositely disposed separately renewable insulating cover members for the head insulatingly extending and enclosing the guideway therein, means detachably securing said cover members to said head, means in the body initially urging the plunger with a yielding pressure against a welding rod and means on the body actuable for exerting a non-yielding pressure against the welding rod.

4. A welding rod holder comprising an elongate conducting element having a protective covering extending substantially about at least one end of said element, means at said end for retaining a welding rod in substantially fixed angular relation to said conducting element, and a readily renewable welding rod sheath, removably fixed upon said conducting element adjacent the mentioned end thereof and extending laterally to a substantial extent from said element and beyond said protective covering, and at least partially about the latter, whereby to protect all mentioned parts adjacent said sheath from the damaging effect of heat thrown off by a welding rod associated with said holder.

5. A welding rod holder according to claim 4, further characterized in that an outer surface of said sheath tapers to a substantially reduced diameter at the end thereof remote from said conducting element, whereby to deflect heat from said retaining means and conducting element.

HENRY SHAW.

REFERENCES CITED

The following references are of record in the file of this patent:

UNITED STATES PATENTS

| Number | Name | Date |
| --- | --- | --- |
| 1,069,697 | Hills | Aug. 12, 1913 |
| 2,131,861 | Smith | Oct. 4, 1938 |
| 2,233,618 | Leach | Mar. 4, 1941 |
| 2,342,966 | Paulson | Feb. 29, 1944 |
| 2,343,799 | Radabaugh | May 7, 1944 |
| 2,357,663 | Klingeberg | Sept. 5, 1944 |

FOREIGN PATENTS

| Number | Country | Date |
| --- | --- | --- |
| 399,584 | Great Britain | Oct. 12, 1933 |